United States Patent [19]

Burg

[11] Patent Number: 4,655,048
[45] Date of Patent: Apr. 7, 1987

[54] HYPOBARIC STORAGE OF NON-RESPIRING ANIMAL MATTER WITHOUT SUPPLEMENTARY HUMIDIFICATION

[76] Inventor: Stanley P. Burg, 3770 Kent Ct., Miami, Fla. 33133

[21] Appl. No.: 805,749

[22] Filed: Dec. 6, 1985

[51] Int. Cl.$^4$ .............................................. F24F 3/16
[52] U.S. Cl. ......................................... 62/78; 34/15; 34/92; 62/100; 62/268; 165/30; 426/418
[58] Field of Search ........................ 62/78, 100, 268; 426/418, 419; 165/30; 34/92, 15

[56] References Cited

U.S. PATENT DOCUMENTS

| Re. 28,995 | 10/1976 | Burg | 426/419 |
|---|---|---|---|
| 2,519,931 | 8/1950 | Roschen et al. | 426/418 |
| 2,629,232 | 2/1953 | Lathan, Jr. | 426/419 |
| 3,102,777 | 9/1963 | Bedrosian et al. | 62/78 |
| 3,102,778 | 9/1963 | Bedrosian et al. | 62/78 |
| 3,102,779 | 9/1963 | Brody et al. | 62/78 |
| 3,233,334 | 2/1969 | Hamilton | 34/15 |
| 3,313,631 | 4/1967 | Jensen | 426/418 |
| 3,333,967 | 8/1968 | Burg | 426/524 |
| 3,365,307 | 1/1968 | Dixon | 426/524 |
| 3,810,508 | 5/1974 | Burg et al. | 62/268 |
| 3,913,661 | 10/1975 | Burg et al. | 165/30 |
| 3,958,028 | 5/1976 | Burg | 62/268 |
| 4,061,483 | 12/1977 | Burg | 62/268 |

OTHER PUBLICATIONS

Hoke, K. E.: "Effect of Modified Atmospheres on Meat During Storage & Long Term Transit", D. H. Dewey, Ed. 2nd National Controlled Atmosphere Conf., Apr. 5-7, 1977, Mich. State Univ., pp. 294-301.
Burg et al: "Metabolism, Heat Transfer & Water Loss Under Hyperbaric Conditions", M. Lieberman, Ed. Plenum Press, (1983), pp. 399-424.
George et al: "Oxidation of Metmyoglobin to Metalyoglobin by Oxygen", Journal of Biochemistry 51: 518, pp. 103-107.
Seiderman et al: "Effect of Degree of Vacuum and Length of Storage on the Physical Characteristics of Vacuum Packaged Beef Wholesale Cuts", Journal of Food Science, vol. 41, (1976), pp. 732-737.
Johnson, B: "Food Source Changing Produce Shipping Industry", Intermodal Transportation Container News, (6/1982), pp. 20-21.
"Protecting Perishible Foods During Transport by Motor Truck", Agriculture Handbook No. 105, USDA, pp. 125-130.
Loesche, W. J.: "Oxygen Sensitivity of Various Anaerobic Bacteria": Applied Microbiology, vol. 18, No. 5, pp. 723-727, (1969).
Ledward, D. A.: "Metmyoglobin Formation in Beef Stored in $CO_2$ Enriched & $O_2$ Depleted Atmospheres", Journal of Food Science, vol. 35, (1970), pp. 33-36.

Primary Examiner—Ronald C. Capossela
Attorney, Agent, or Firm—Robert M. Schwartz; Edward I. Mates

[57] ABSTRACT

The hypobaric preservation of non-respiring animal matter without the step of adding fresh air to the storage chamber, and without humidifying the storage atmosphere by contacting it with a supplementary body of heated water, is hereby disclosed, characterized by storage at a controlled temperature correlated to the type of animal matter, by a hypobaric pressure slightly less than the vapor pressure of water at said storage temperature, and by evacuation at a controlled rate correlated to the storage temperature and the weight of stored animal matter. The evacuation rate preferably is set to pump nearly saturated steam from the vacuum tank at a rate which exhausts an amount of water equal to about 1% of the initial weight of the animal matter each month. Heat is continuously supplied to the non-respiring animal matter responsive to the temperature of said matter and sufficient to evaporate said amount of water and prevent the non-respiring animal matter from freezing responsive to this amount of evaporative cooling. Said preferred rate of evaporation creates a slight vapor pressure gradient between the animal matter and moisture in the chamber atmosphere, causing the chamber pressure to be lower than the vapor pressure of water at the storage temperature. The water activity at the surface of the animal matter is decreased proportionate to said vapor pressure lowering, inhibiting superficial microbial growth on the animal matter.

17 Claims, 1 Drawing Figure

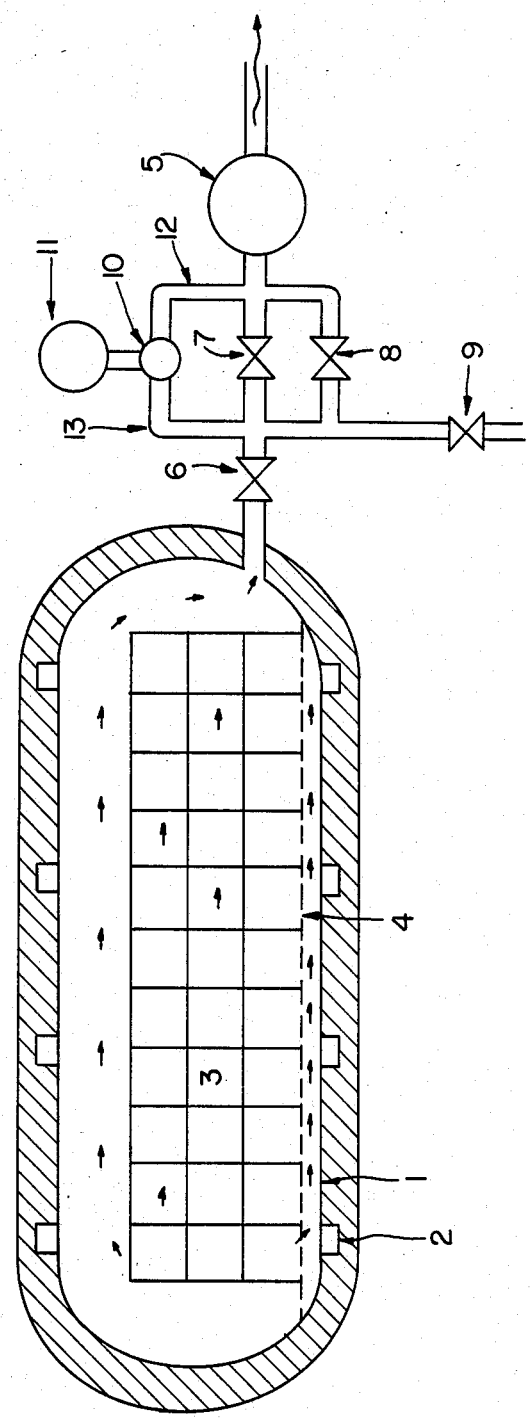

HYPOBARIC STORAGE OF NON-RESPIRING ANIMAL MATTER WITHOUT SUPPLEMENTARY HUMIDIFICATION

REFERENCES CITED

| U.S. PATENT DOCUMENTS | | |
|---|---|---|
| 3,333,967 | 8/1967 | Burg |
| 3,810,508 | 5/1974 | Burg et al. |
| 3,913,661 | 10/1975 | Burg et al. |
| 3,958,028 | 5/1976 | Burg |
| 4,061,483 | 12/1977 | Burg |
| Reissue 28,995 of U.S. Pat. No. 3,333,967 | 10/1976 | Burg |

BACKGROUND OF THE INVENTION

In my prior U.S. Pat. No. 3,333,967, now U.S. Pat. No. Re. 28,995, a method is disclosed for preserving mature but less than fully ripe fruit which produce ethylene and are ripened thereby, using hypobaric conditions of about 100 to 400 mm HgA pressure in a flowing stream of humidified, nearly water-saturated air. This method gave useful results on a laboratory scale and under favorable conditions on a somewhat larger scale, but not when the size was increased and the pressure reduced below 100 mm HgA to improve the storage performance with certain mature but less than fully ripe fruit and to extend the utility of the method to other types of metabolically active matter, including animal matter. The evaporative cooling effect when air is contacted with a body of water which is relatively smaller in relation to the whole storage space than was the body of water in relation to the size of a conventional laboratory vacuum vessel decreases the temperature of the humidifying water. In my prior U.S. Pat. Nos. 3,810,508 and 3,913,661 with W. Hentschel, I disclose how to use and profit by this cooling to lessen the work of, or eliminate other ways and means of cooling the chamber, but refrigerating by evaporating water runs counter to the objective of creating and maintaining high humidity. As the water cools, its vapor pressure is lowered and it tends to add progressively less moisture to the incoming air so that the relative humidity in the chamber is reduced and the product dries and spoils prematurely.

In my prior U.S. Pat. Nos. 3,958,028 and 4,061,483 I disclose how to overcome the evaporative cooling effect and provide a constant high relative humidity in the storage chamber. Incoming expanded atmospheric air is preconditioned to the pressure and temperature inside the vacuum chamber, and then it is contacted with a body of heated water to saturate the chamber atmosphere. I also disclose that a relatively broad spectrum of correlated hypobaric pressures and low temperatures at a high relative humidity is operational in preserving metabolically active matter at pressures ranging from 4 to 400 mm HgA.

The humidification step of U.S. Pat. Nos. 3,958,028 and 4,061,483 has prevented the development of economically useful commercial hypobaric intermodal transportation containers which embody the equipment and the method of these older patents. It is impractical to displace valuable cargo with the weight and volume of water which is needed to continuously saturate the incoming dry expanded atmospheric air changes during a prolonged oceanic trip, so instead of smaller amount of stored water has to be recycled by reclaiming the moisture which condenses when the saturated chamber atmosphere is exhausted by and compressed in a vacuum pump. Though otherwise preferable, an oil-seal vacuum pump cannot be used for this purpose because its exhaust is contaminated with oil, making water reclamation unfeasible. Instead, contemporary 40×8×8 foot prototype hypobaric intermodal transportation containers are equipped with a water-sealed vacuum pump, which is injected with enough refrigerated seal water to promote and sustain a nearly isothermal compression, and supercharged with a Roots vacuum pump to improve efficiency at low inlet pressures. The refrigeration equipment needed to cool the seal water uses nearly 5 KW of electric power, the supercharged vacuum system about 3 KW more than an oil seal vacuum pump having comparable effective displacement, and the heating element in the humidifier up to 2 additional regulated KW. Not only does the humidification step more than double the size of the refrigeration and motor generating systems which are needed, but in addition it creates a requirement for automatic boiler filling and flushing systems, automatic drains and heating tapes to prevent equipment freeze-up during periods of operation and inoperation at ambient temperatures lower than 0° C., and complex safeguards and controls to integrate the systems. In this manner the humidification step increase the equipment and operational costs, reduces reliability and maintainability, and increases the transportation cost per pound of metabolically active matter.

In my prior U.S. Pat. Nos. 3,958,028 and 4,061,483 I disclose a method and equipment for preserving metabolically active animal matter such as red meats, poultry, fish and shrimp by placing said matter in an enclosed space, adding fresh air to and moving humid air from said space, maintaining the humidity in said space between 80 and 100% by contacting the incoming fresh air with a body of heated water, controlling the temperature of said animal matter between −1° and +2° C., and maintaining the pressure in said space at least slightly higher than the vapor pressure of water in said matter, and preferably between 8 and 50 mm HgA for different types of metabolically active animal matter. This method increases the storage life of various types of animal matter up to 2 to 3-fold compared to storage at the same temperature in a conventional forced-air coldroom, but by the end of the maximum hypobaric storage period so little shelf-life remains that often the animal matter cannot be distributed without spoilage. An additional problem which limits the utility of this older method with red meats is premature superficial browning of exposed cut surfaces. For most types of animal matter, the permissible storage time which still provides adequate shelf life using the method of U.S. Pat. No. 3,958,028 and equipment of U.S. Pat. No. 4,061,483 is not long enough to permit reliable oceanic distribution using intermodal hypobaric shipping containers to transport said animal matter from preferred sources of supply to markets which provide the greatest demand.

SUMMARY OF THE INVENTION

Preserving non-respiring animal matter for a longer period of time, in better condition, with more remaining shelf-life than has been possible heretofore using the method of U.S. Pat. No. 3,958,028 and equipment of U.S. Pat. No. 4,061,483 is one object of my invention. Another object is the elimination of the humidification step of U.S. Pat. Nos. 3,958,028 and 4,061,483, wherein atmospheric air is preconditioned to an optimal storage pressure and temperature and then saturated by contacting it with a body of heated water. I store fresh non-respiring animal matter in a vacuum tank at a controlled temperature between about $-1.7°$ and $+2°$ C., and continuously evacuate the tank *without* introducing *any* fresh air thereto. When the chamber pressure has been decreased to the vapor pressure of water in the animal matter, cool steam boils from said matter and flushes out the last vestiges of oxygen from the storage tank, thereby creating an anerobic condition especially conducive to the preservation of non-respiring animal matter. Then I adjust the evacuation rate to continuously exhaust an amount of nearly saturated steam from the chamber equal to about 1% of the animal matter's initial fresh weight each month. To prevent the animal matter from freezing responsive to the cooling effect engendered by this rate of water evaporation I continuously supply heat to said matter by convection and radiation from the chamber atmosphere and walls respectively, sufficient to maintain the temperature of said matter between $-1.7°$ and $+2°$ C. The steady-state total pressure in the vacuum tank typically is 20–30% lower than the vapor pressure of water at the temperature of the animal matter, in part because of dissolved solutes in said matter's water, but much more importantly because a vapor pressure gradient develops between the animal matter and chamber atmosphere sufficient to cause the continuous movement of water vapor from the animal matter, across its surface area, and into the chamber atmosphere at the same rate that nearly saturated steam is evacuated from the vacuum tank.

Non-respiring animal matter such as beef, pork, horsemeat, lamb, poultry, fish and shrimp, stored by the method and equipment of my new invention, is preserved in better condition for a substantially longer period of time compared to equivalent animal matter stored at the same temperature by the method of U.S. Pat. No. 3,958,028 and equipment of U.S. Pat. 4,061,483. This improvement in performance is caused by the lower oxygen partial pressure and water activity which my new method maintains at the surface of said animal matter. An anaerobic condition is far more effective than a slight oxygen partial pressure in inhibiting the growth of aerobic and microaerophilic slime and odor forming bacteria which are largely responsible for the spoilage of animal matter, and also in preventing the oxidative browning of blood and muscle pigments and the oxidative yellowing of fat. The lower surface water activity, corresponding to a 70 to 80% relative humidity and caused by the 20 to 30% reduction in steady-state water vapor pressure in the chamber atmosphere, inhibits the growth of many types of bacteria, molds and yeasts, whereas a saturated condition promotes the growth of these same organisms. The controlled weight loss of about 1% per month improves the appearance of the animal matter's surface covering without causing an undesireable amount of shrinkage, and the continuous flow of nearly saturated steam from the animal matter, into and through the vacuum chamber, to the atmosphere, removes and flushes away any odors which may form in or on the animal matter. This improvement in preservation is accomplished without incoming air flow or supplementary humidification, using equipment which is simpler, more reliable, easier to maintain, lighter in weight, smaller in size and volume, less energy consumptive, and less costly than that disclosed in U.S. Pat. No. 4,061,483.

BRIEF DESCRIPTION OF THE DRAWING

The FIGURE is in part a schematic flow diagram and in part a diagrammatic representation of one form of chamber and apparatus embodying and/or suitable for practicing my new invention.

DESCRIPTION OF THE PREFERRED EMBODIMENTS

There are at least five factors or conditions which mutually influence the storage of non-respiring animal matter in my new hypobaric system, namely:
1. Temperature
2. Oxygen partial pressure at the surface of the animal matter
3. Water activity at the surface of the animal matter
4. Rate of water loss from the animal matter
5. Ventilation It is presently believed that all types of fresh animal matter are best preserved at their freezing point, about $-1.7°$ C., or at a temperature slightly higher than their freezing point, about $-1°$ C. If the temperature is raised by a few degrees, the animal matter can be kept for only about half as long, due mainly to the high temperature coefficient for the growth of psychrophilic spoilage bacteria in the $-1.7°$ to $+2°$ C. range. At about $-1.7°$ C., crust freezing occurs at the surface of animal matter but the interior remains unfrozen. Crust frozen animal matter is preserved for a considerably longer time than similar matter kept only $1°$ C. warmer, but the shelf-life of the crust frozen meat after it is thawed sometimes is forshortened because ice crystal formation and subsequent melting usually causes cells to burst. The exact temperature at which freezing occurs varies somewhat in different types of animal matter, and even amongst different parts or samples of the same type, depending upon water content, chemical composition, and other factors. Therefore, in certain instances the preferred storage temperature is somewhat higher or lower than $-1.7°$ to $-1°$ C.

Oxygen has several different effects on fresh animal matter depending in part on the type of matter. It oxygenates the blood and muscle pigments, hemogolobin and myoglobin, converting them from their non-oxygenated 'blue' form to their oxygenated 'red' form which gives the characteristic 'red bloom' to red meats. Oxygen also may oxidize each of these pigments to a brown oxidation product, methemoglobin or metmyoglobin, under certain conditions. The penetration of oxygen into and through red meat occurs so slowly the to the density of the flesh, that respiratory oxygen consumption in the superficial layers consumes oxygen more rapidly than it can enter, creating an anaerobic 'blue' zone beginning only a few mm below the surface of red meat stored in atmospheric air. Consequently most of the bulk of fresh meat is anaerobic and therefore unable to respire and product heat. It is for this reason that I refer to animal matter as non-respiring. Hemoglobin and myoglobin in the superficial layer are sensitized to oxidation when these pigments are not oxygenated, and since the oxygen partial pressure and degree of oxygenation decrease in an inward direction, the tendency for these pigments to oxidize and brown also increases in that direction, reaching a maximum just prior to the anaerobic zone, and then abruptly all browning ceases because there is no oxygen present to cause oxidation. When the ambient oxygen partial pressure is lowered, progressively the anaerobic zone migrates closer to the surface, until at a hypobaric pressure of 8 to 50 mm HgA it begins a fraction of a mm below the surface. Now the intense browning at the leading edge of the anaerobic zone no longer is obscured by a lighter brown intervening layer, so the meat appears unusually brown to the viewer. It is for this reason that the method of U.S. Pat. No. 3,958,028 and equipment of U.S. Pat. No. 4,061,483 seem to accelerate the superficial browning of red meats. One method presently used to prevent superficial browning exposes the surface of the meat to an unusually high concentration of oxygen, much higher than in atmospheric air, but this has the disadvantage that it favors the growth of aerobic spoilage bacteria and the oxidative yellowing of fat. I simultaneously prevent superficial browning of the surface of red meats, fat oxidation, and the growth of aerobic and microaerophilic slime and odor forming spoilage bacteria by removing all oxygen from the vacuum chamber.

Even in the absence of all oxygen, fresh animal matter eventually spoils in part due to the growth of various types of anaerobic bacteria, yeasts, and a few types of molds on the surface of the animal matter. Each microbial form has its own particular water activity ($a_w$) requirement: for example, Lactobacilli only grow if $a_w \geq 0.91$ (91% relative humidity); many other types of psychrotrophic spoilage bacteria only grow if $a_w \geq 0.93$ to 0.98; most psychrotropic yeasts require $a_w \geq 0.87$ to 0.91, although a few tolerate as low as 0.7 to 0.8, and various psychrotrophic molds require $a_w \geq 0.80$ to 0.88. Therefore, lowering the water activity at the surface of animal matter invariably slows the growth of many forms of surface microbes, but water activity cannot be decreased indescriminantly without considering other functions which it fulfills. The water activity must be kept high enough to prevent excessive weight loss and shrinkage. I have discovered that when I adjust the evacuation rate to exhaust nearly saturated steam from the vacuum chamber at a rate of about 1% of the initial weight of the animal matter each month, the surface water activity is lowered sufficiently to inhibit the growth of most types of microbes, but not enough to cause an undesireable amount of shrinkage and drying. To the contrary, most consumers prefer the appearance of the animal matter when it has dried to this extent, and object to the appearance when all drying is prevented by a saturated relative humidity. The effective pump capacity needed to evacuate the appropriate amount of water each month can be computed from the expression:

$$\% \text{ weight loss/month} = 2.3 \times 10^{-3} S_{eff}/Md_1 \quad \text{Equation 1}$$

where $S_{eff}$ is the effective pump capacity (cfm) required, $d_1$ is the density of saturated steam (pounds/ft$^3$) at the storage temperature, and M is the weight (pounds) of animal matter. The necessary evacuation rate depends in part on the storage temperature since the density of saturated steam varies as a function of temperature, and it also depends upon the amount of animal matter stored. Consequently, if a portion of the cargo is unloaded, or if additional cargo is added, the evacuation rate should be lowered or raised proportionate to the amount of cargo removed or added.

At steady-state, the rate of water movement from the animal matter, through its surface area, into the chamber atmosphere, equals the rate at which nearly saturated steam is evacuated from the chamber. The rate at which water moves out of the animal matter depends in part on the magnitude of the vapor pressure gradient between water in the animal matter and moisture in the chamber atmosphere. The vapor pressure of the animal matter's water initially is slightly lower than the vapor pressure of pure water at the same temperature because the animal matter contains dissolved solutes. The steady-state vapor pressure in the storage chamber must be even lower than this to provide the vapor pressure gradient needed to supply product water as rapidly as the vacuum pump removes it. Since water vapor pressure constitutes the total pressure of the chamber atmosphere, the tank pressure always is significantly lower than the vapor pressure of water at the storage temperature. When full loads of meat are stored at $-1°$ C. by my new method, the steady-state pressure in the vacuum tank typically ranges from 3 to 3.5 mm HgA, compared to 4.3 mm HgA for pure water at the same temperature. Therefore, the surface water activity is approximately 3 to 3.5 divided by 4.3, or about 0.7 to 0.8. This range of surface water activity is preferred when meat is stored by conventional forced air refrigeration.

Because non-respiring animal matter produces almost no heat, the energy required to continuously evaporate 1% of said matter's water each month must come from an external source. Otherwise the non-respiring animal matter would decrease in temperature and freeze. I continuously provide heat to the animal matter by convection and radiation from the chamber atmosphere and walls respectively, responsive to the temperature of said animal matter and sufficient to keep said matter's temperature between about $-1.7°$ and $+2°$ C. When the ambient temperature is significantly warmer than $-1.7°$ to $+2°$ C., more than the needed amount of heat tends to be transmitted through the insulated chamber walls, and therefore I use refrigeration means to prevent the entry of all but the needed heat. When the ambient temperature is colder than $-1.7°$ to $+2°$ C., I use heating means to supply the needed heat to the animal matter, as well as to compensate for the outward loss of heat by transmission through the insulated chamber walls to the ambient environment.

My new invention continuously ventilates the storage chamber to remove undesireable odors which form in and otherwise would be retained by the animal matter. Said ventilation is accomplished by means of nearly saturated steam, without admitting air or any other vapor to the vacuum chamber. The steam is released from the animal matter responsive to supplementary heat, it flows through the vacuum chamber flushing away odors, and finally it is pumped out of the chamber and exhausted to the atmosphere.

In the FIGURE non-respiring animal matter 3 is preserved in insulated vacuum tank 1 and kept at a controlled low temperature by refrigeration and heating means 2, depicted as ducts for recirculating heat exchange media, where said ducts may also constitute the stiffening rings of vacuum tank 1. Initially, full-flow valve 8 is closed and tank isolation valve 6, blow-down valve 9, and throttling valve 7 are opened; 2-way selector valve 10 is positioned to connect conduit 13 to absolute vacuum gauge 11; and vacuum pump 5 is turned on. When the pressure in conduit 13 has decreased to an arbitrary low value, measured on gauge 11, blow-down valve 9 is opened slightly to establish an arbitrary steady-state pressure ($P_1$) on conduit 13, which is measured by gauge 11. Throttling valve 7 is then adjusted to provide the proper evacuation rate computed by means of equation 1 for the weight of stored animal matter and the selected storage temperature. This adjustment is made by progressively closing throttling valve 7 and comparing $P_1$ to the pressure ($P_2$) at the inlet to pump 5, where $P_2$ is measured by positioning 2-way selector valve 10 to connect conduit 12 and vacuum pump 11. Throttling valve 7 is properly adjusted when it provides the necessary $P_2/P_1$ ratio in accord with the expression:

$$S_{eff} = SP_2/P_1 \qquad \text{Equation 2}$$

where S is the volumetric capacity of vacuum pump 5 and $S_{eff}$ is the effective evacuation rate. To pump down the vacuum tank as rapidly as possible, high capacity full-flow valve 8 and tank isolation valve 6 are opened, and blow down valve 9 is closed. The tank pressure is monitored on gauge 11 by positioning 2-way selector valve 10 to connect gauge 11 to conduit 13. When the pressure in tank 1 stabilizes at about 3 to 4 mm HgA, depending in part on the storage temperature, full-flow valve 8 is closed, throttling the evacuation rate to the value established by throttling valve 7. Vacuum chamber 1 is repressurized prior to adding or removing cargo by turning off vacuum pump 5 and opening blow down valve 9. Boxes of cargo are stacked on ventilated floor 4, and hanging animal matter is suspended by means of meat rails welded to the ceiling of vacuum tank 1.

Tests with lamb, beef and horsemeat, in which my new method has been compared with the older method of U.S. Pat. No. 3,958,028, have shown that my new method preserves these types of non-respiring animal matter about 2 to 3-fold longer, with better appearance and subsequent shelf-life.

An additional advantage of my new method is that it improves space utilization in the vacuum tank by permitting solid stacks of boxed animal matter to be "vacuum cooled", whereas ventilating spaces are required between boxes when animal matter is stored and cooled using the older method of U.S. Pat. No. 3,958,028. Animal matter preferably is precooled at atmospheric pressure before it is placed in the vacuum tank, but the temperature of said matter seldom reaches close to −1.7° C. in the precooler, and subsequently said matter's temperature invariably rises significantly during loading so that further cooling is required after hypobaric conditions are enstated. Convective heat transfer is impeded at a low atmospheric pressure due to the reduction in air density; radiative heat transfer is ineffective between densely packed cartons; but evaporative heat transfer is promoted due to the pressure dependence of the vapor mass transfer coefficient. Therefore under hypobaric conditions sensible heat is removed almost exclusively by latent heat transfer. The older method of U.S. Pat. No. 3,958,028 keeps the pressure in the vacuum tank higher than the vapor pressure of water in the stored animal matter, and depends upon natural convective air flow through ventilating spaces to move evaporated moisture from the surface of the animal matter to the cold wall of the vacuum tank. My new method keeps the vapor pressure and total pressure in the vacuum tank slightly lower than the water vapor pressure in the animal matter so that product water continuously boils. The vapor pressure of the steam released at the surface of the animal matter is that characteristic of water at the temperature of the animal matter, whereas close to the wall of the vacuum tank the vapor pressure is that characteristic of water at the temperature of the cold plate. Moisture released from the animal matter flows along this absolute pressure gradient, creating a highly effective heat transfer coupling between the animal matter and cold plate without a requirement for ordered ventilating channels.

I claim:

1. A method of preserving non-respiring animal matter comprising:
    placing said animal matter in a storage tank,
    continuously controlling the temperature of said animal matter to a temperature range between just above the freezing point of said animal matter and 3.7 degrees Celsius above said freezing point,
    simultaneously continuously evacuating said storage tank without introducing any air into said storage tank to remove oxygen from said storage tank, and
    controlling the evacuation rate to continuously evacuate cool steam that boils from said animal matter and flushes oxygen from said storage tank during said temperature controlling and continuous evacuation steps, said evacuating step being performed at a rate to continuously evacuate steam from said storage tank at a rate equal to 0.1% to 3.0% of the initial fresh weight of said animal matter per month to create an anaerobic condition especially conducive to preserve non-respiring animal matter in said storage tank.

2. The method as set forth in claim 1 wherein the non-respiring stored matter comprises animal products such as beef, lamb, pork, horsemeat, poultry, fish, shrimp and shellfish, and the temperature is controlled between −1.7° and +2° C., while the pressure ranges from about 2 to 5 mm HgA.

3. The method as set forth in claim 1 wherein said evacuation rate is controlled to remove nearly saturated steam from said chamber at a rate which exhausts an amount of water each month equal to between about 1% of the initial fresh weight of the stored animal matter.

4. The method as set forth in claim 1 wherein said controlled continuous evacuation rate is sufficient to decrease the steady-state water activity at the surface of the animal matter to less than 1.0.

5. A method as set forth in claim 4, wherein said controlled continuous evacuation is performed at a rate sufficient to decrease the steady state water activity at the surface of said animal matter to between about 0.7 and about 0.8.

6. The method of claim 1 wherein said controlled evacuation is performed at a rate that induces a continuous vaporization of cold steam from the animal matter, sufficient to flush away and remove from the vacuum chamber essentially all oxygen as well as any odors produced on or by the animal matter.

7. A method as set forth in claim 1, wherein said anaerobic condition is created by maintaining a steady state total pressure in said storage tank that is 20% to 30% lower than the vapor pressure of water at the temperature of said animal matter.

8. A method as set forth in claim 1, wherein said evacuation rate is modified whenever animal matter is removed from or added to said storage tank.

9. A method as set forth in claim 8, wherein a portion of said animal matter is removed from said storage tank, further including reducing said evacuation rate to maintain a rate of continuously evacuating steam from said storage tank to a rate equal to 0.1% to 3.0% per month of the initial weight of the remainder of said animal matter after said removal per month.

10. A method as set forth in claim 8, wherein additional of said animal matter is added to said storage tank, further including increasing said evacuation rate to maintain a rate of continuously evacuating steam from said storage tank to a rate equal to 0.1% to 3.0% per month of the weight of said animal matter at the time of said addition.

11. A method as set forth in claim 1, wherein said temperature controlling step includes the step of supplying sufficient heat to said animal matter to prevent the latter from freezing responsive to said evaporation of cool steam.

12. A method as set forth in claim 11, comprising supplying said sufficient heat by convection from the storage tank atmosphere and by radiation from the walls of said storage tank.

13. A method as set forth in claim 1, further including ventilating said storage tank by having said animal matter supplying nearly saturated steam free of air within said storage tank during said evacuating step.

14. Storage apparatus for non-respiring animal matter comprising a storage tank constructed and arranged to receive and preserve said storage matter,
    means for continuously controlling the temperature of said animal matter to a temperature range between just above the freezing point of said animal matter and 3.7 degrees Celsius above said freezing point,
    means for continuously evacuating said storage tank at a regulated rate without introducing any air into said storage tank to remove oxygen from said storage tank,
    means to actuate said temperature control means and said evacuating means to operate simultaneously,
    means for controlling said regulated rate to a rate that continuously evacuates steam that boils from said animal matter at an evacuation rate equal to 0.1% to 3.0% of the initial fresh weight of said animal matter per month to create an anaerobic condition especially conducive to preserve non-respiring animal matter in said storage tank, and
    means for controlling the rate of heat transmission between the ambient environment outside said storage tank and the interior of said storage tank.

15. Storage apparatus as set forth in claim 14, wherein said storage tank has walls separating said ambient environment from said interior and heat exchanger means is operatively associated with said walls to keep the temperature of said walls and said interior sufficiently higher than that of said animal matter to prevent said animal matter from freezing and below a temperature at which said animal matter would be heated to a temperature higher than 3.7 degrees Celsius above its freezing point.

16. Storage apparatus as in claim 15, wherein said temperature control means comprises refrigerating means, heating means and control means cooperating with said refrigerating means and said heating means to maintain said animal matter at a temperature range between $-1.7$ degrees Celsius and $+2$ degrees Celsius.

17. Storage apparatus as in claim 14, wherein said temperature control means comprises refrigerating means, heating means and control means cooperating with said refrigerating means and said heating means to maintain said animal matter at a temperature range between $-1.7$ degrees Celsius and $+2$ degrees Celsius.

* * * * *